United States Patent
Rybicki

(10) Patent No.: US 8,249,527 B2
(45) Date of Patent: Aug. 21, 2012

(54) MULTIMEDIA CLIENT/SERVER SYSTEM, CLIENT MODULE, MULTIMEDIA SERVER, RADIO RECEIVER AND METHODS FOR USE THEREWITH

(75) Inventor: Mathew A. Rybicki, Austin, TX (US)

(73) Assignee: VIXS Systems, Inc., Toronto, Ontario ( * ) Notice: Subject to any disclaimer, the term of this patent is extended or adjusted under 35 U.S.C. 154(b) by 1059 days.

(21) Appl. No.: 11/351,003

(22) Filed: Feb. 9, 2006

(65) Prior Publication Data

US 2007/0184875 A1    Aug. 9, 2007

(51) Int. Cl.
*H04B 1/04* (2006.01)
*H04B 17/02* (2006.01)

(52) U.S. Cl. ........ 455/101; 455/103; 455/104; 455/132; 455/137; 455/140; 455/41.1; 455/41.2; 455/41.3

(58) Field of Classification Search ............ 455/41, 455/500, 101, 103, 104, 132, 137, 140
See application file for complete search history.

(56) References Cited

U.S. PATENT DOCUMENTS

| | | | | |
|---|---|---|---|---|
| 6,643,522 | B1 * | 11/2003 | Young | 455/552.1 |
| 6,914,539 | B2 * | 7/2005 | Hoctor et al. | 340/870.12 |
| 6,992,990 | B2 * | 1/2006 | Sakusabe | 370/293 |
| 7,499,462 | B2 * | 3/2009 | MacMullan et al. | 370/401 |
| 2002/0039884 | A1 * | 4/2002 | Raynes et al. | 455/13.3 |
| 2003/0008623 | A1 * | 1/2003 | Uesugi | 455/70 |
| 2004/0259518 | A1 * | 12/2004 | Aktas et al. | 455/323 |
| 2005/0032497 | A1 * | 2/2005 | Girardeau et al. | 455/272 |
| 2006/0153389 | A1 * | 7/2006 | Temerinac et al. | 381/2 |
| 2007/0002961 | A1 * | 1/2007 | Hoctor et al. | 375/267 |
| 2007/0047659 | A1 * | 3/2007 | Aleksic | 375/240.25 |

* cited by examiner

*Primary Examiner* — Wen Huang
(74) *Attorney, Agent, or Firm* — Garlick & Markison; Bruce E. Stuckman

(57) ABSTRACT

A radio receiver includes a first receiver module for converting a first radio frequency (RF) signal at a first carrier frequency into a first baseband signal. A second receiver module converts a second RF signal at a second carrier frequency into a second baseband signal. A recombination module combines the first baseband signal and the second baseband signal into an output signal.

24 Claims, 10 Drawing Sheets

MULTIMEDIA CLIENT/SERVER SYSTEM, CLIENT MODULE, MULTIMEDIA SERVER, RADIO RECEIVER AND METHODS FOR USE THEREWITH

TECHNICAL FIELD OF THE INVENTION

This invention relates generally to wireless communication systems and more particularly to in-home local area networking for content such as multimedia.

BACKGROUND OF THE INVENTION

With the number of households having multiple television sets increasing, and many users wanting the latest and greatest video viewing services. As such, many households have multiple satellite receivers, cable set-top boxes, modems, et cetera. For in-home Internet access, each computer or Internet device has its own Internet connection. As such, each computer or Internet device includes a modem.

As an alternative, an in-home wireless local area network may be used to provide Internet access and to communicate multimedia information to multiple devices within the home. In such an in-home local area network, each computer or Internet device includes a network card to access a server. The server provides the coupling to the Internet. The in-home wireless local area network can also be used to facilitate an in-home computer network that couples a plurality of computers with one or more printers, facsimile machines, as well as to multimedia content from a digital video recorder, set-top box, broadband video system, etc.

In such wireless communication systems, the data is transmitted via radio frequencies (RF) in accordance with one or more data transmission protocols. In any type of wireless communication system, the reception of transmitted information can be susceptible to fading, interference and noise over the communication channel that degrades the quality of the received information, decreases the transmission rate or otherwise lowers the performance of the communication channel. Therefore, a need exists for a method and apparatus for a communication system to overcome the above-mentioned issues in a manner that can efficiently implemented.

SUMMARY OF THE INVENTION

The present invention sets forth a multimedia client/server system, multimedia server module, client module, radio receiver and methods for use therewith substantially as shown in and/or described in connection with at least one of the figures, as set forth more completely in the claims that follow.

DETAILED DISCUSSION OF A PREFERRED EMBODIMENT

Figure 1:
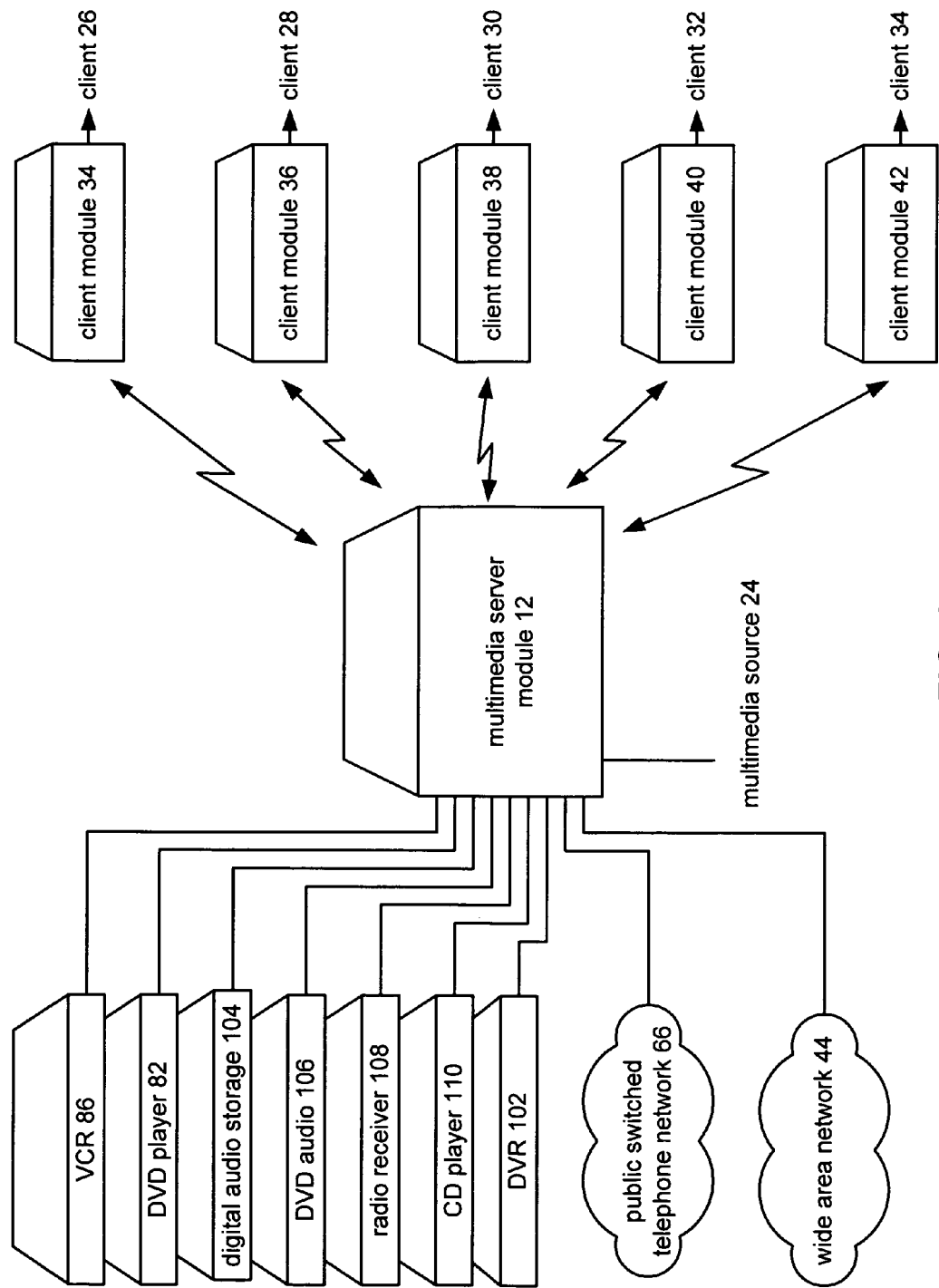
FIG. 1 presents a pictorial representation of a multimedia client server system in accordance with an embodiment of the present invention.

FIG. 1 presents a pictorial representation of a multimedia client server system in accordance with an embodiment of the present invention. The multimedia client server system includes multimedia server 12, client modules 34, 36, 38, 40 and 42 that are coupled to clients 26, 28, 30, 32, and 34, and a plurality of multimedia sources. The multimedia sources include video cassette recorder (VCR) 86, digital video disk (DVD) player 82, digital video recorder (DVR) 102, digital audio storage device 104, DVD audio 106, radio receiver 108, CD player 110, public switch telephone network 66, wide area network 44 (such as a private network, public network, satellite network, cable network and/or the Internet) for accessing broadcast, stored or streaming audio, video and/or other multimedia content and/or any other type of audio, video and/or multimedia source 24.

In an embodiment of the present invention, the clients 26-34 may select playback from, and/or connection to, any one of the multimedia sources. The selection request from each client module would identify the desired multimedia source, the client, the desired service and any other information to assist the multimedia server 12 in processing the request. As such, one client may be accessing the Internet, while another client is watching a satellite broadcast channel, while another is listening to a CD playback, while another is talking on the telephone, and yet another is watching a DVD playback. This is all done via the multimedia server 12 without requiring the clients to have direct access to the multimedia sources and without the requirement that each client have its own multimedia source and/or multimedia source connection.

The multimedia server 12 and one or more of the client modules 34, 36, 38, 40 and 42 include one or more features for increasing the reliability and quality of wireless transmission in accordance with the present invention, as will be described in greater detail in the Figures that follow, and in particular, with reference to FIGS. 3-11.

Figure 2:
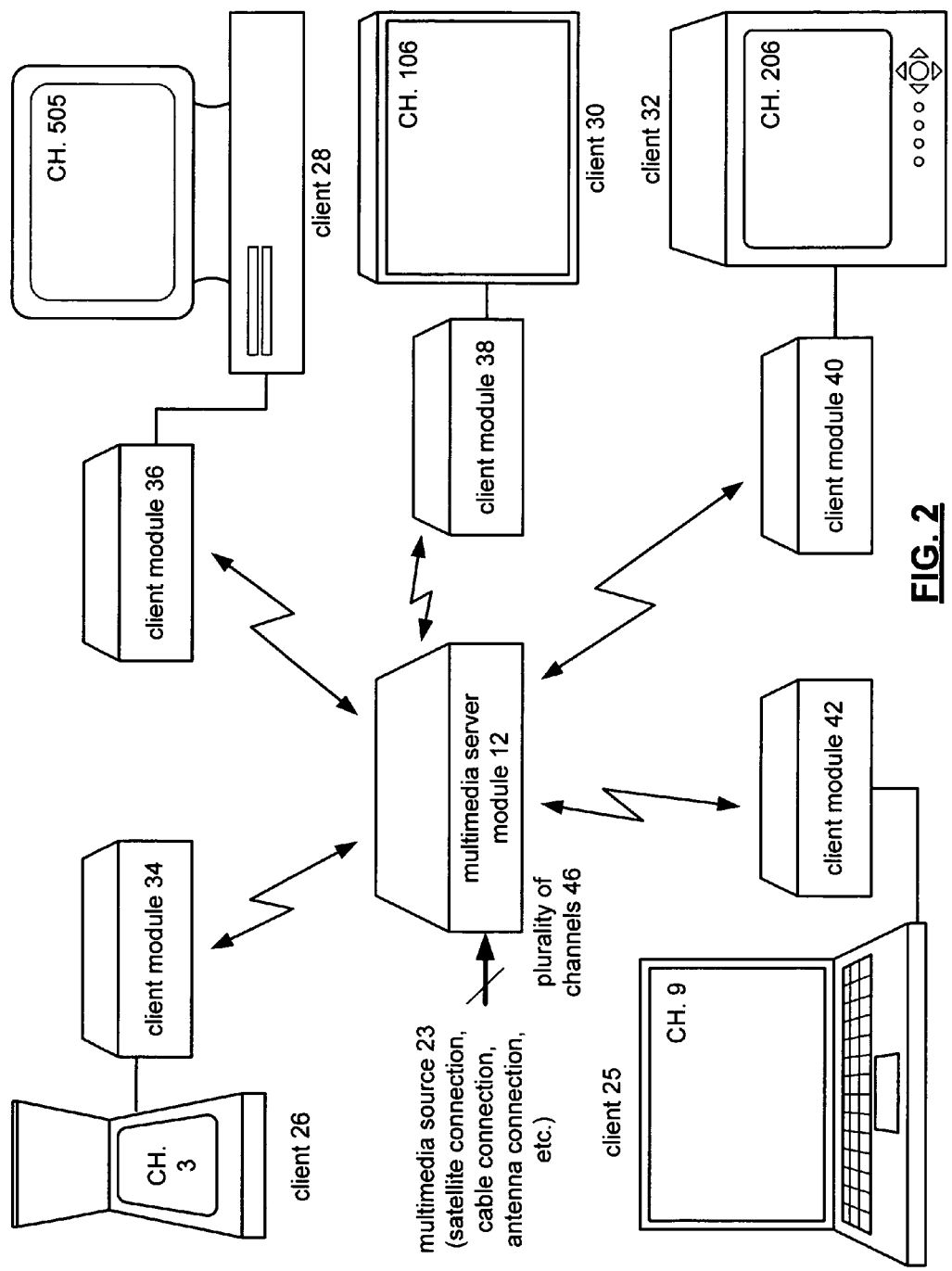
FIG. 2 presents a pictorial representation of a multimedia client/server system in accordance with an embodiment of the present invention.

FIG. 2 presents a pictorial representation of a multimedia client/server system in accordance with an embodiment of the present invention. In particular, a multimedia client/server system includes a multimedia server 12, a plurality of client modules 34, 36, 38, 40 and 42 that are operably coupled to a plurality of clients 25, 26, 28, 30, and 32. The multimedia server 12 is operably coupled to receive a plurality of channels 46 from a multimedia source 23. The multimedia source 23 can be a broadcast, stored or steaming multimedia signal, from a video cassette recorder (VCR) 86, digital video disk (DVD) player 82, digital video recorder (DVR) 102 digital audio storage device 104, DVD audio 106, radio receiver 108, CD player 110, public switch telephone network 66, wide area network 44 (such as a private network, public network, satellite network, cable network and/or the Internet for accessing broadcast, stored or streaming audio, video and/or other multimedia content) and/or any other type of audio, video and/or multimedia source 24. As one of average skill in the art will appreciate, the multimedia server 12 may be a stand-alone device, may be incorporated in a satellite receiver, set-top box, cable box, HDTV tuner, home entertainment receiver, et cetera. In addition, the multimedia server 12 may be implemented using discrete components, integrated circuits, and/or a combination thereof.

The multimedia server 12 communicates with the plurality of client modules 34, 36, 38, 40, and 42 via a radio frequency communication path. As such, the multimedia server 12 and each of the client modules 34, 36, 38, 40 and 42 each include a transceiver that operates to send and receive data via the communication path.

As shown, each client module is operably coupled to one of the clients. For example, client module 34 is operably coupled to client 26, which is representative of a personal digital assistant. Client module 36 is operably coupled to client 28, which is representative of a personal computer. Client module 38 is operably coupled to client 30, which is representative of a monitor (e.g., LCD monitor, flat panel monitor, CRT monitor, et cetera). Such a monitor may include speakers, or a speaker connection, control functions including channel select, volume control, picture quality, et cetera. Client module 40 is operably coupled to client 32, which may be a television set, high definition television (HDTV), standard definition television (SDTV), a home theatre system, et cetera. Client module 42 is operably coupled to client 25, which is representative of a laptop computer.

As one of average skill in the art will appreciate, each client module may be a separate device from its associated client or embedded within the client. In addition, one of average skill in the art will further appreciate that the client modules 34, 36, 38, 40 and 42 may be implemented utilizing discrete components and/or integrated circuits.

In an embodiment of the present invention, each of the clients, via its associated client module, selects one or more channels from the plurality of channels 46. As shown, client 26 has selected channel 3 of the plurality of channels for viewing. Accordingly, client module 34 relays the channel selection of channel 3 to the multimedia server 12. The multimedia server 12 selects channel 3 from the plurality of channels 46. The data corresponding to channel 3 is then time multiplexed with the data for the other channels and transmitted from the multimedia server 12 to each of the client modules 34, 36, 38, 40 and 42. Client module 34 monitors the transmission from the multimedia server 12 and extracts the data corresponding to channel 3. The extracted data for channel 3 is then provided to the client 26 for display.

Client module 36, 38, 40 and 42 perform a similar function for their associated clients 28, 30, 32 and 25, respectively. As shown, client 28 has selected channel 505, client 30 has selected channel 106, client 32 has selected channel 206 and client 25 has selected channel 9. The client modules 36, 38, 40 and 42 provide the channel selection of its respective client to the multimedia server 12. Multimedia server 12 extracts the selected channels from the plurality of channels for each selection request, multiplexes the data for each of the selected channels (for this example channel 3, 9, 106, 206 and 505) into a stream of data. The stream of data is then transmitted to each of the client modules. Each client module extracts the appropriate data of the selected channel for its respective client. For example, client module 36 monitors the transmitted data for data related to channel 505, client module 38 monitors for data related to channel 106, client module 40 monitors the transmission for data related to channel 206 and client module 42 monitors the transmission for data related to channel 9.

From each client's prospective, the client 25, 26, 28, 30 and 32 has independent access to the multimedia source 23. Accordingly, client 26 may at any time change its channel selection from, for example, channel 3 to channel 120. The client module 34 provides the channel selection request which may be the absence of acknowledgements to the multimedia server 12, which now retrieves data related to channel 120 for client 36 as opposed to channel 3. As an alternate embodiment, the functionality of client modules 34, 36, 38, 40 and 42 may vary. For example, client module 34 may not provide all the independent functionality that client module 36 does. For example, client module 34 may not have independent channel selection capabilities but only selecting channels that one of the other clients have selected. Alternatively, one client module may service a plurality of clients.

Figure 3:
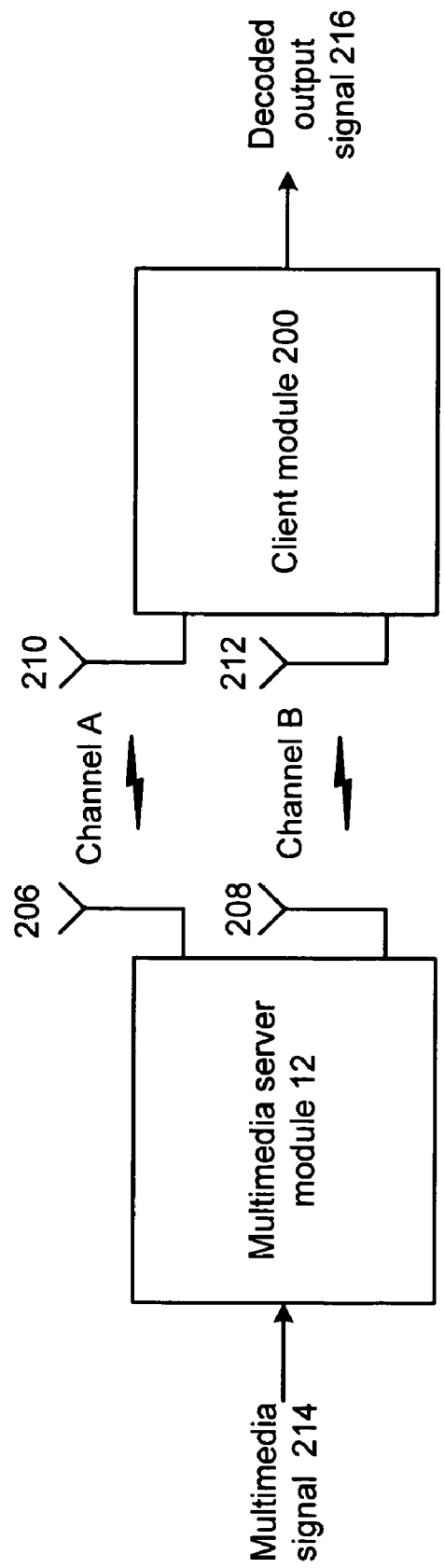
FIG. 3 presents a block diagram representation of a multimedia client/server system in accordance with an embodiment of the present invention.

FIG. 3 presents a block diagram representation of a multimedia client/server system in accordance with an embodiment of the present invention. In particular, the multimedia client/server system includes multimedia server 12 that transmits a multimedia signal 214, such as a broadcast, stored or streaming signal from multimedia source 23. Multimedia server module 12 transmits, via antennas 206 and 208, two radio frequency (RF) signals that contain duplicate copies of the multimedia content from multimedia signal 214. These two RF signals are transmitted at two carrier frequencies corresponding to channel A and channel B of an RF spectrum. Client module 200, (such as client modules 34, 36, 38, 40 and 42) receives these two RF signals via antennas 210 and 212 and produces a decoded output signal 216.

In should be noted that channel A and channel B represent different channels of an RF spectrum corresponding to different carrier frequencies. This is as opposed to channels 3, 9, 106, 206 and 505 discussed in association with FIG. 2 where "channel", is this context, was used primarily to denote difference streams of multimedia content such as "The Weather Channel", "The Discovery Channel" or "Gone with the Wind". The transmission of duplicate content over two carrier frequencies provides frequency diversity to the transmission. A recombination scheme can be utilized in the client module 200 to reconstruct the multimedia signal 214 in the presence of noise, interference and fading in both channels, providing a more reliable transmission between multimedia server module 12 and client module 200. In the event that noise, interference or fading hamper the performance of one of the channels, the content can still be recovered over the remaining channel.

Figure 4:
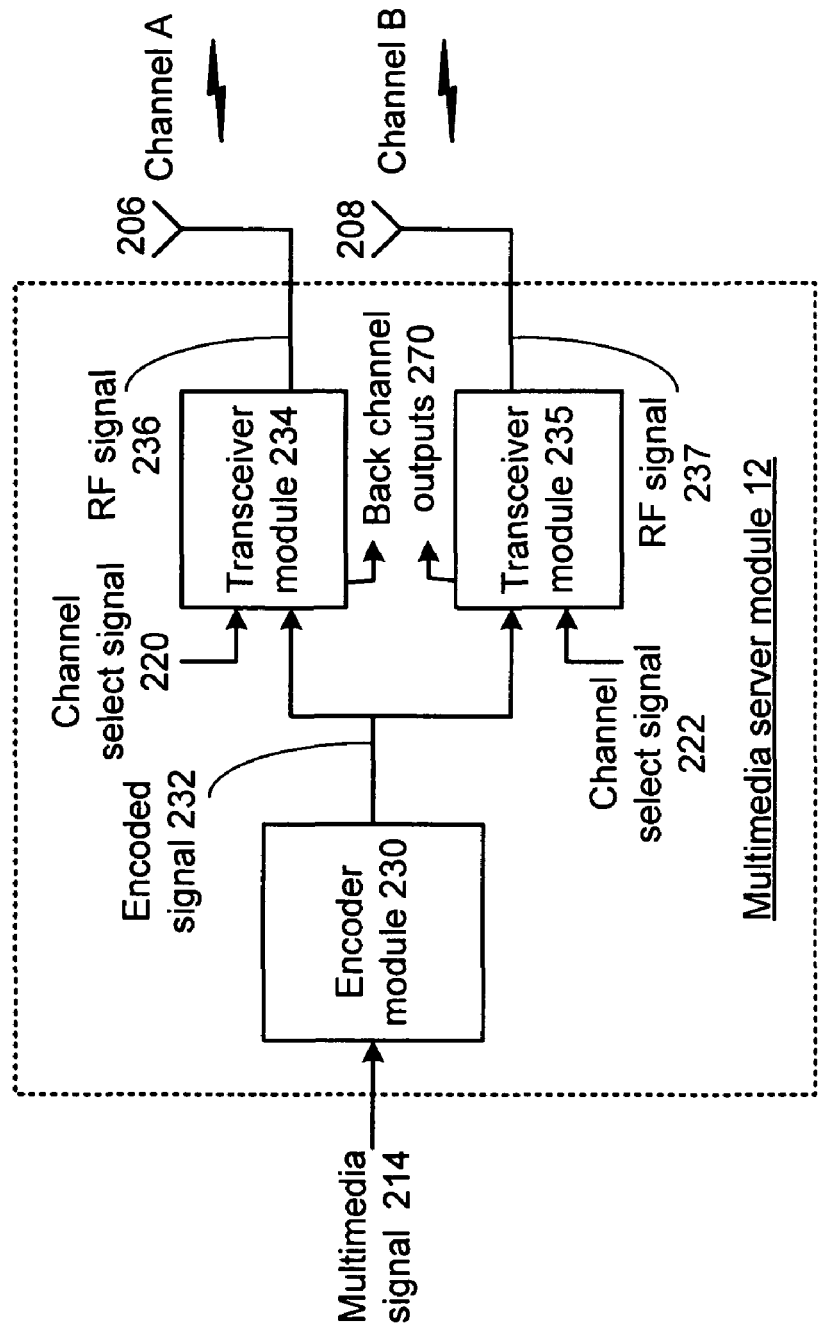
FIG. 4 presents a block diagram representation of a multimedia server module in accordance with an embodiment of the present invention.
Figure 5:
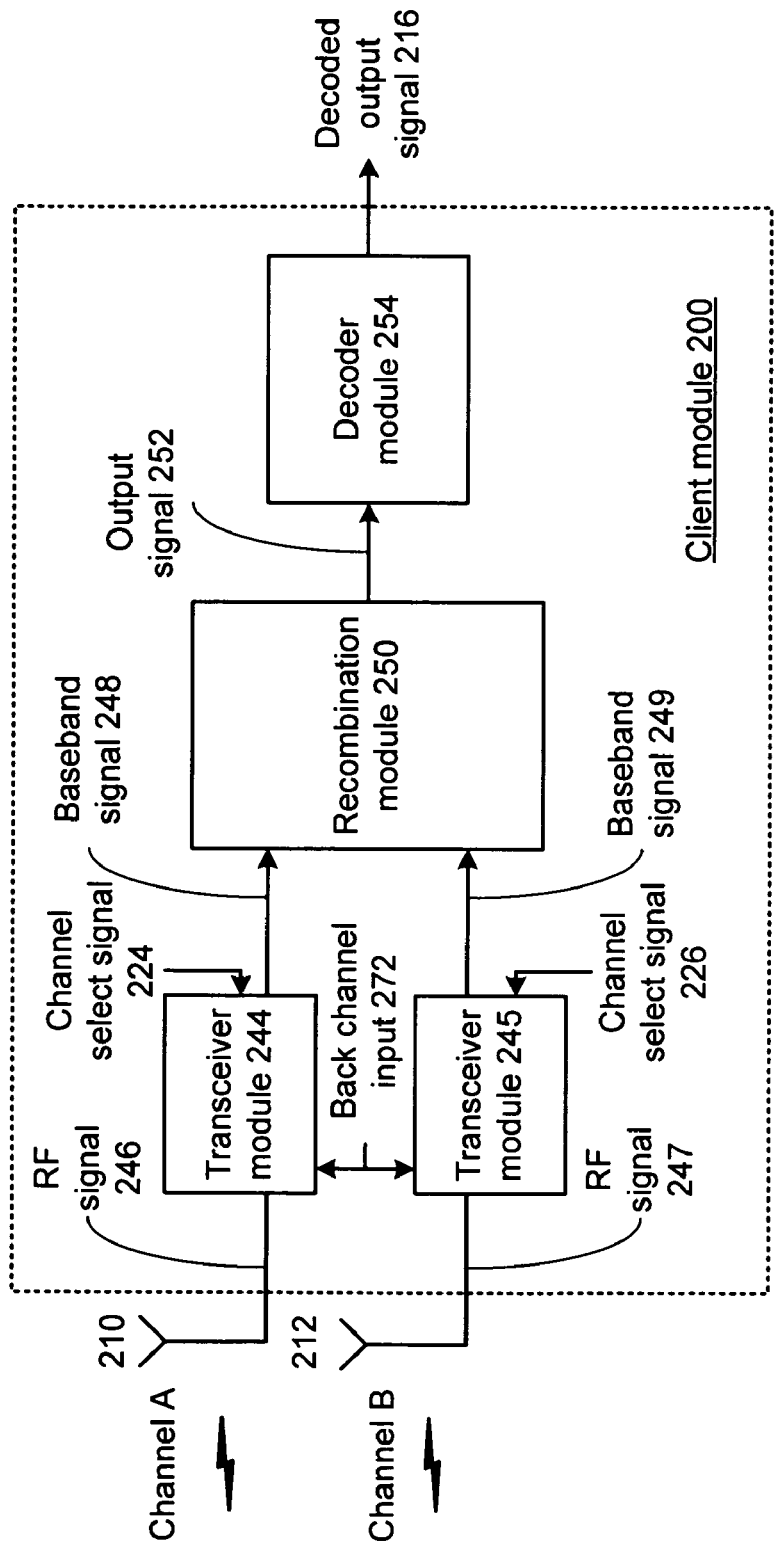
FIG. 5 presents a block diagram representation of a client module in accordance with an embodiment of the present invention.

Further functions and features of the multimedia server module 12 and client module 200 are presented in conjunction with FIGS. 4 and 5.

FIG. 4 presents a block diagram representation of a multimedia server module in accordance with an embodiment of the present invention. In particular, multimedia server module 12 includes an encoder module 230 for producing an encoded signal 232 from from unencoded multimedia input signal 214. In an embodiment of the present invention, the encoding scheme may be one or more of multilevel, multiphase and multifrequency encoding, non-return to zero encoding, Manchester encoding, block encoding and/or nB/mB encoding wherein n>m. For example, the nB/mB may be 4B/5B encoding where 4 bits of actual data are converted into 5 bits of encoded data.

Encoding may further include compression, transrate and transcode encoding of the multimedia signal based on the content and format of multimedia signal 214 and the bandwidth and performance of channels A and channel B. In an embodiment, the multimedia signal 214 includes an analog composite video signals that is formatted in any of a number of video formats including National Television Systems Committee (NTSC), Phase Alternating Line (PAL) or Sequentiel Couleur Avec Memoire (SECAM). The encoded signal 232 may be digitized, compressed, and channel coded for transmission at low data rates in weak channel conditions or higher data rates in stronger channel conditions. Alternatively, multimedia signal 214 can be already in a digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. In this case, the encoding performed by encoder module 230 may be limited to encoding of the data for the channel, based on the strength or quality of the channel conditions, with or without further compression.

Multimedia server module 12 further includes transceiver module 234 for modulating the encoded signal 232 to produce a RF signal 236 at a first carrier frequency and for transmitting the first RF signal 236 over channel A using antenna 206. Transceiver module 235 modulates the encoded signal 232 to produce RF signal 237 at a second carrier frequency and transmits the RF signal 237 over channel B using antenna 208. In addition, transceiver modules 234 and 235 produce back channel outputs 270 based on RF signals received from the client module 200 over channels A and B. In an embodiment of the present invention, the back channel outputs can be recombined in similar fashion to the recombination that will be described in conjunction with client module 200 for the forward transmission path.

In an embodiment of the present invention, transceiver modules 234 and 235 are selectively tunable to a plurality of other carrier frequencies in response to channel selection signals 220 and 222. For instance, in an implementation of the multimedia server module 12 and client module 200 using wireless transmission link in the United States that conforms with the IEEE 802.11g standard, channels A and B can be selected as any two of the 11 allocated channels. In an embodiment of the present invention, the channel selection signals can be preprogrammed into multimedia server module 12, dynamically chosen based on a site survey that scans the available channels to determine two suitable channels for use, received from the client module 200 or arbitrated between the client module 200 and multimedia server module 12, or selected under user control.

In an embodiment of the present invention, antenna 206 is placed a distance apart from antenna 208 so as to be spatially diverse. In an embodiment of the present invention, the spacing is substantially $\leq \frac{1}{4}$ wavelength of the corresponding carrier frequency. However, other spacings may likewise be implemented as will be apparent to one skilled in the art when presented the disclosure herein.

FIG. 5 presents a block diagram representation of a client module 200 in accordance with an embodiment of the present invention. In particular, client module 200 includes transceiver module 244 for receiving RF signal 246 at a first carrier frequency from multimedia server module 12 and for converting the RF signal 246 into a baseband signal 248. Transceiver module 245 receives RF signal 247 at a second carrier frequency from a multimedia server module 12 and converts RF signal 247 into a baseband signal 249. The frequency diversity scheme is accomplished by recombination module 250 that combines the baseband signal 248 and baseband signal 249 into output signal 252. Duplicate copies of the multimedia content are received, aligned and combined in such a fashion to compensate for data that is missing or corrupted from one or the other of the received signals. In addition, transceiver modules 244 and 245 are operable to modulate back channel input 272 to produce RF signals sent to multimedia server module 12 over channels A and B.

In an embodiment of the present invention, multimedia server module 12 and client module 200 use a wireless transmission link that conforms with the IEEE 802.11g standard that uses a 52-subcarrier orthogonal frequency division multiplexing (OFDM) with a maximum data rate of 54 Mbits/sec. The data rate is reduced in increments in response to adverse channel conditions from 48 mbits/sec, down to as low as 6 Mbits/sec by modifying the modulation and effective coding rate from 64-quadrature amplitude modulation (64-QAM) to binary phase shift keying (BPSK). The 52 subcarriers of a channel are spaced 312.5 kHz apart, where 48 of the subcarriers carry data, and 4 subcarriers carry pilot tones. In an embodiment of the present invention, recombination module 250 utilizes a maximum ratio recombination on a subcarrier basis for each of the 48 data-bearing subcarriers of the channel to combine the baseband signals 248 and 249 into a single output signal 252. However, other recombination schemes may likewise be implemented including phase alignment of the baseband signals and summation, or choosing the signal with the maximum received signal strength or with the highest signal to noise ratio, etc. This recombination compensates for the many of the effects of fading, interference (including multipath interference), and noise. Baseband signals 248 and 249 may also be low intermediate frequency (IF) signals.

In an embodiment of the present invention recombination module 250 formats output signal 252 in a data format such as Universal Serial Bus (USB), Personal Computer Interface (PCI), Firewire, or small computer service interface (SCSI), however, other data formats, either standard or proprietary may likewise be implemented within the broad scope of the present invention.

Client module 200 further includes decoder module 254 for decoding the output signal 252 into a decoded output signal, such as in a format used by the attached client. In particular, further decoding of the data can include decompression of a compressed digital signal, formatting of a video signal as in NTSC, PAL, SECAM, etc., and other formatting to match the input format of the client device.

In an embodiment of the present invention, transceiver modules 244 and 245 are selectively tunable to a plurality of other carrier frequencies in response to channel selection signals 224 and 226. For instance, in an implementation of the multimedia server module 12 and client module 200 using wireless transmission link in the United States that conforms with the IEEE 802.11g standard, channels A and B can be selected as any two of the 11 allocated channels. In an embodiment of the present invention, the channel selection signals can be preprogrammed into client module 200, dynamically chosen based on a site survey that scans the available channels to determine two suitable channels for use, received from the multimedia server module 12 or arbitrated between the client module 200 and multimedia server module 12, or selected under user control.

In an embodiment of the present invention, antenna 210 placed a distance apart from antenna 212 so as to be is spatially diverse. In an embodiment of the present invention, the spacing is substantially ¼ wavelength of the corresponding carrier frequency. However, other spacings may be likewise be implemented as will be apparent to one skilled in the art when presented the disclosure herein.

Figure 6:
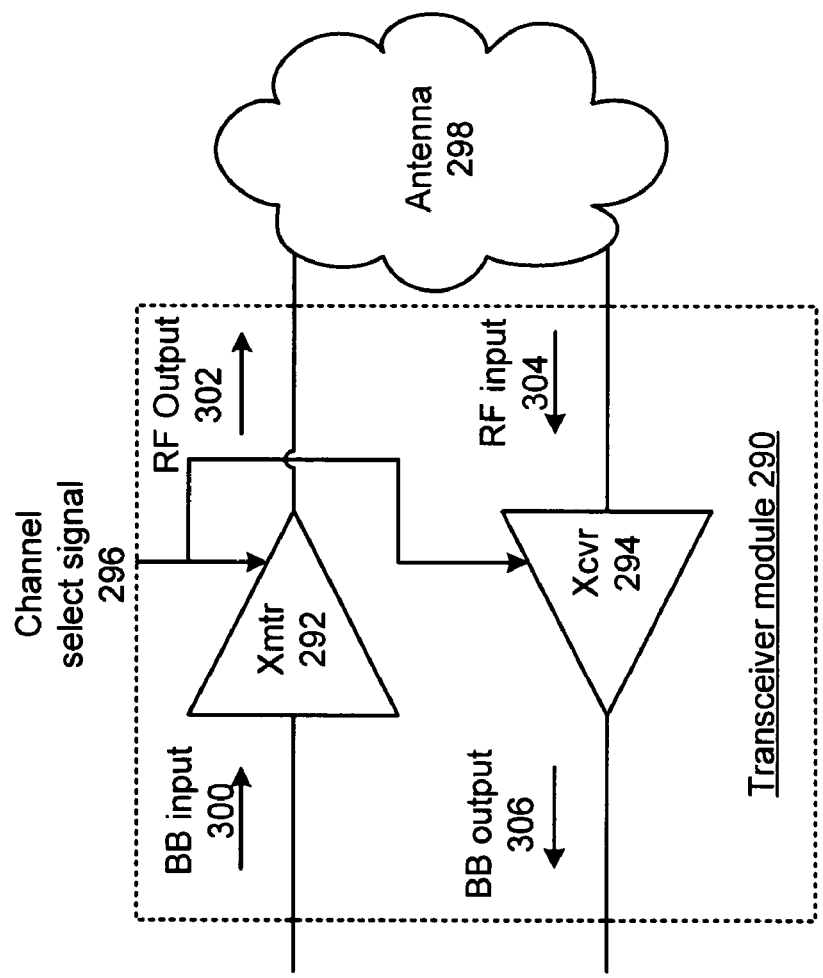
FIG. 6 presents a schematic block diagram representation of a transceiver module in accordance with an embodiment of the present invention.

FIG. 6 presents a schematic block diagram representation of a transceiver module in accordance with an embodiment of the present invention. While the communication between multimedia server module 12 and client module 200 is described primarily in terms of the forward transmission of multimedia content from the multimedia server module 12 to the client module 200, in an embodiment of the present invention, a reciprocal back channel is also present that allows for the flow of control and signaling data, channel selections (including the selections of the channel frequencies of channels A and B and the selection of the content of multimedia signal 214) as well as the flow of other user data such as an Internet uplink, transmitted telephony signals, etc. Transceiver module 290, such as transceivers 234, 235, 244 and/or 245, includes a transmitter 292 for modulating a baseband (BB) input 300 by a carrier frequency derived from channel selection signal 296, such as channel selection signals 220, 222, 224 and 226, to form an RF output 302. In addition, receiver 294 receives an RF input 304 that is demodulated, based on a carrier frequency derived from channel selection signal 296. Baseband input 300 and baseband output 306 may also be low IF signals.

In an embodiment of the present invention, antenna 298, such as antennas 206, 208, 210 and 212, includes a dedicated antenna element for transmitter 292 and receiver 294. In other embodiments however, a single antenna element can be coupled so as to be shared by both transmit and receive paths.

Figure 7:
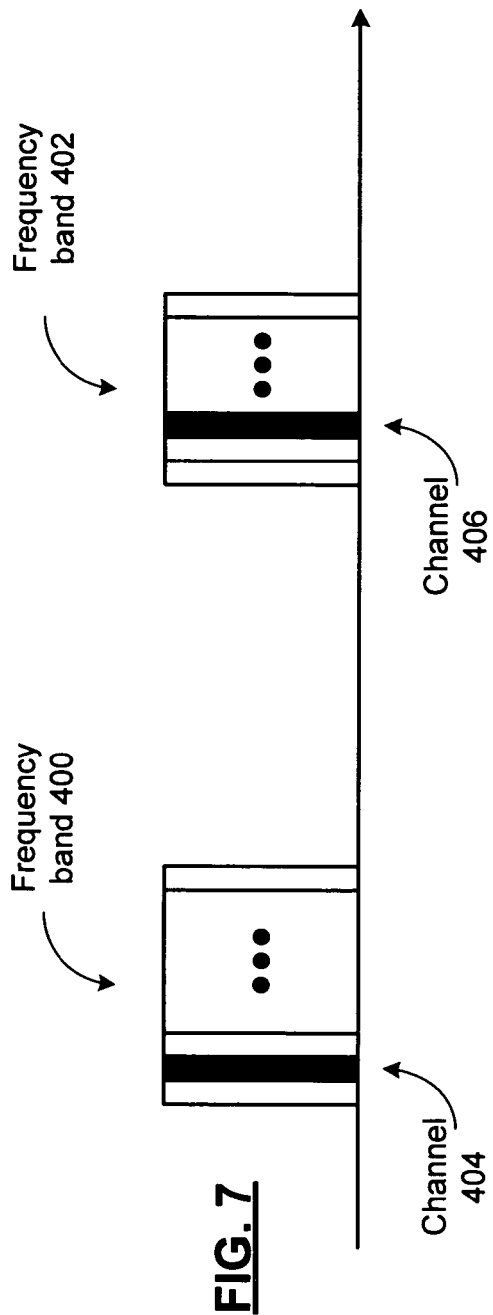
FIG. 7 presents a graphical representation of a frequency spectrum in accordance with an embodiment of the present invention.
Figure 8:
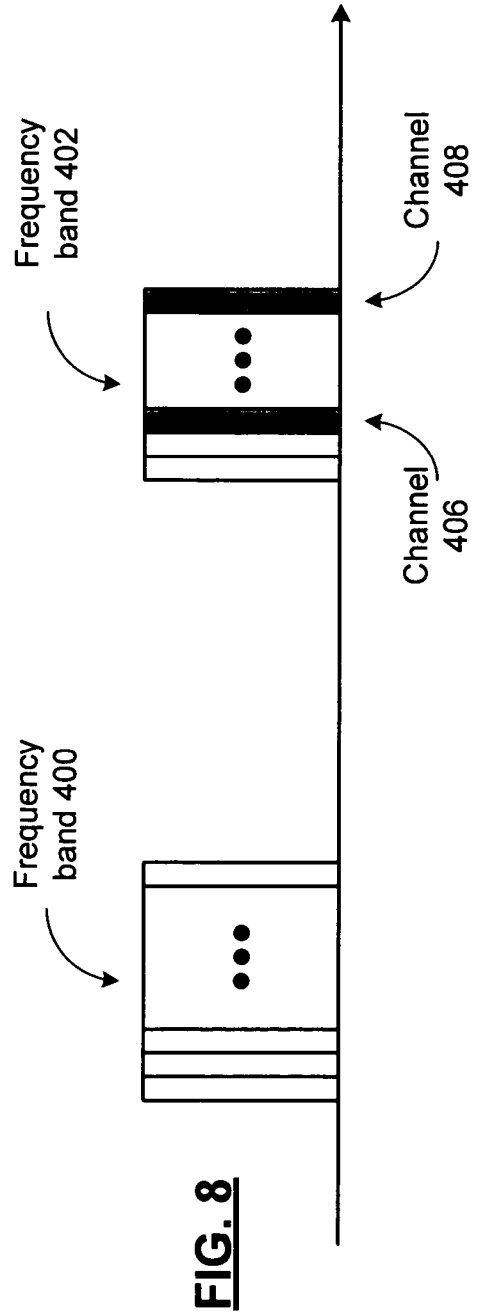
FIG. 8 presents a graphical representation of a frequency spectrum in accordance with an embodiment of the present invention.

FIGS. 7 and 8 present graphical representations of a frequency spectrum in accordance with an embodiment of the present invention. In an embodiment of the present invention, channel A and channel B are implemented using any two channels of the available spectrum such as the Institute of Electrical and Electronics Engineers (IEEE) 802.11x compliant wireless link in either the 2.4 gigahertz (GHz) frequency band or the 5 GHz frequency band. As used herein 802.11x refers to a system conforming to any of the IEEE 802.11 family of specifications. In FIG. 7, the channels 404 and 406 that are used, such as channel A and channel B, have corresponding carrier frequencies that fall within separate frequency bands 400 and 402. In an embodiment of the present invention, the frequency band 400 corresponds to the 2.4 GHz frequency band and the frequency band 402 corresponds to a 5 GHz frequency band. This diversity between frequency bands potentially increases the diversity between channels 404 and 406 and potentially increases the quality of the recombined output signal 252. In an alternative embodiment of the present invention shown in FIG. 8, channel 406 and channel 408 are chosen from different portions of a single frequency band such as, respectively, the upper half and lower half of the frequency band 402. In general, the further the spacing between the carrier frequencies of channels A and B, the lesser the possibility that a single source of interference could be present on both channels.

The description above has been limited to spectrum reserved for 802.11x compliant broadband access networks, in an alternative embodiment of the present invention, other spectrum and other wireless links including Ultra Wideband (UWB), Worldwide Interoperability for Microwave Access (WiMAX) and other wireless links can likewise be implemented.

Figure 9:
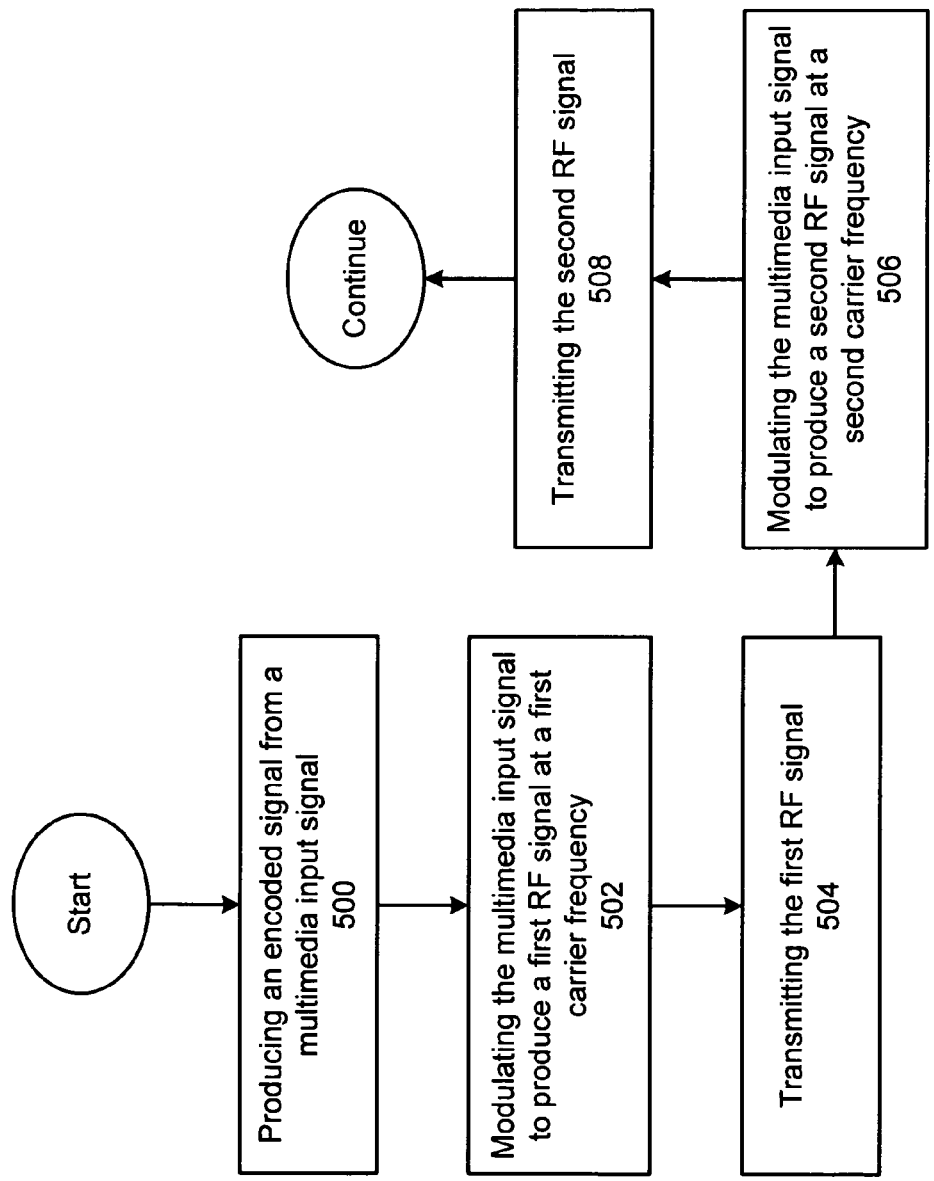
FIG. 9 presents a flow chart representation of a method in accordance with an embodiment of the present invention.

FIG. 9 presents a flow chart representation of a method in accordance with an embodiment of the present invention. In particular, a method is presented for use in conjunction with one or more of the functions and features described in association with FIGS. 1-8. In step 500, an encoded signal is produced from a multimedia input signal. In step 502, the multimedia input signal is modulated to produce a first radio frequency (RF) signal at a first carrier frequency. In step 504, the first RF signal is transmitted. In step 506, the multimedia input signal is modulated to produce a second RF signal at a second carrier frequency. In step 508, the second RF signal is transmitted.

In an embodiment of the present invention, the first RF signal and the second RF signal are carried over separate channels of a broadband wireless access network, wherein the broadband wireless access network conforms to at least one of the following standards: 802.11x, Ultra Wideband (UWB), and Worldwide Interoperability for Microwave Access (WiMAX). In an embodiment, the first carrier frequency and the second carrier frequency fall within separate frequency bands. Further, the multimedia input signal includes a composite video signal. In addition, the encoded video signal includes at least one of: a transrate compressed signal, and a transcode compressed signal.

Figure 10:
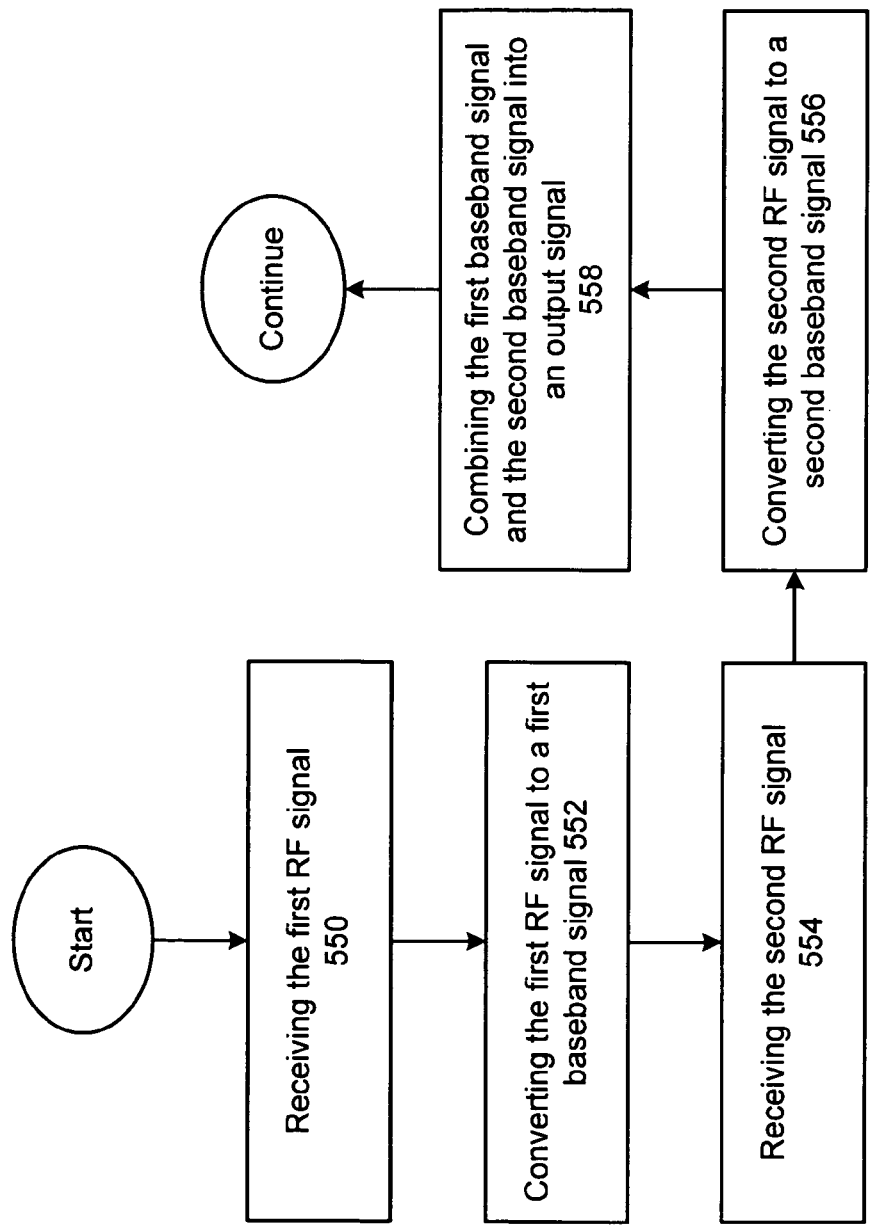
FIG. 10 presents a flow chart representation of a method in accordance with an embodiment of the present invention.

FIG. 10 presents a flow chart representation of a method in accordance with an embodiment of the present invention. In particular, a method is presented for use in conjunction with one or more of the functions and features described in association with FIGS. 1-9. In step 550, a first RF signal is received. In step 552, the first RF signal is converted into a first baseband signal. In step 554, a second RF is received. In step 556, the second RF signal is converted into a second baseband signal. In step 558, the first baseband signal and the second baseband signal are combined into an output signal. In an embodiment of the present invention, step 558 includes combining the first baseband signal and the second baseband signal using a maximum ratio recombination. In an embodiment, the baseband signals may be low IF signals.

Figure 11:
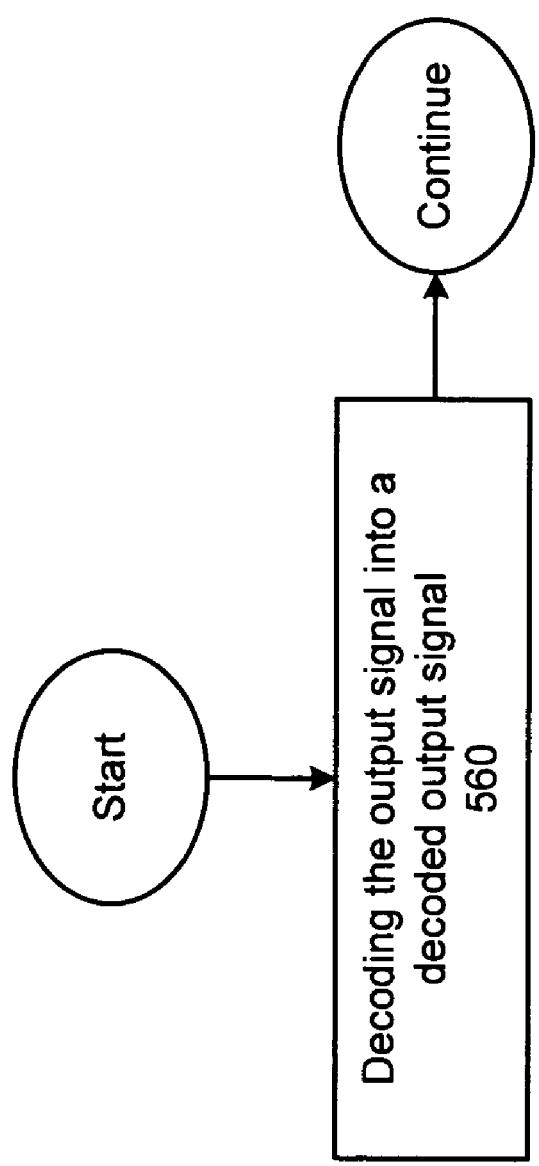
FIG. 11 presents a flow chart representation of a method in accordance with an embodiment of the present invention.

FIG. 11 presents a flow chart representation of a method in accordance with an embodiment of the present invention. In particular, a method is presented for use in conjunction with one or more of the functions and features described in association with FIGS. 10. In step 560, the output signal is decoded into a decoded output signal.

In an embodiment of the present invention, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to order of magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more module functions such as the processing of an input signal to produce an output signal. As used herein, a module may contain submodules that themselves are modules. When implemented in software or firmware, each module can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Thus, there has been described herein an apparatus and method, as well as several embodiments including a preferred embodiment, for implementing a multimedia client/server system, multimedia server module, client module and radio receiver. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A client module comprising:
a first transceiver module for bidirectionally communicating with a multimedia server module by receiving a first radio frequency (RF) signal at a first carrier frequency from the multimedia server module and converting the first RF signal into a first baseband signal and by transmitting a third RF signal to the multimedia server module at the first carrier frequency;
a second transceiver module for bidirectionally communicating with the multimedia server module by receiving a second RF signal at a second carrier frequency from the multimedia server module and converting the second RF signal into a second baseband signal and by transmitting a fourth RF signal to the multimedia server module at the second carrier frequency;
a recombination module, operably coupled to the first transceiver module and the second transceiver module, for combining the first baseband signal and the second baseband signal into an output signal; and
a decoder module, operably coupled to the recombination module, for decoding the output signal into a decoded output signal;
wherein the first transceiver module and the second transceiver module operate in accordance with a communication protocol that includes a plurality of first channels in a first frequency band and a second plurality of channels in a second frequency band that is separated in frequency from the first frequency band and wherein the first carrier frequency corresponds to one of the plurality of first channels and the second carrier frequency corresponds to one of the plurality of second channels.

2. The client module of claim 1 wherein the recombination module combines the first baseband signal and the second baseband signal using a maximum ratio recombination.

3. The client module of claim 1 wherein the first transceiver module is selectively tunable to a plurality of other carrier frequencies in response to a first channel selection signal.

4. The client module of claim 1 wherein the first RF signal and the second RF signal are carried over separate channels of a broadband wireless access network.

5. The client module of claim 4 wherein the broadband wireless access network conforms to at least one of the following standards: 802.11x, Ultra Wideband (UWB), and Worldwide Interoperability for Microwave Access (WiMAX).

6. The client module of claim 1 wherein the decoded output signal includes a composite video signal.

7. The client module of claim 6 wherein the composite video signal includes at least one of: a transrate compressed signal, and a transcode compressed signal.

8. The client module of claim 1 wherein the first transceiver module is operably coupled to a first antenna and the second transceiver module is coupled to a second antenna that is spatially diverse from the first antenna.

9. A radio transceiver comprising:
a first transceiver module for converting a first radio frequency (RF) signal at a first carrier frequency of a first frequency band into a first baseband signal;
a second transceiver module for converting a second RF signal at a second carrier frequency of a second frequency band into a second baseband signal; and
a recombination module, operably coupled to the first transceiver module and the second transceiver module, for combining the first baseband signal and the second baseband signal into an output signal;
wherein the first transceiver module and the second transceiver module each bidirectionally communicate with a multimedia server module in accordance with a communication protocol that includes a plurality of first channels in the first frequency band and a second plurality of channels in the second frequency band that is separated in frequency from the first frequency band and wherein the first carrier frequency corresponds to one of the plurality of first channels and the second carrier frequency corresponds to one of the plurality of second channels.

10. The radio transceiver of claim 9 wherein the recombination module combines the first baseband signal and the second baseband signal using a maximum ratio recombination.

11. The radio transceiver of claim 9 wherein the first transceiver module is selectively tunable to a plurality of other carrier frequencies in response to a first channel selection signal.

12. The radio transceiver of claim 9 wherein the first RF signal and the second RF signal are carried over separate channels of a broadband wireless access network.

13. The radio transceiver of claim 12 wherein the broadband wireless access network conforms to at least one of the following standards: 802.11x, Ultra Wideband (UWB), and Worldwide Interoperability for Microwave Access (WiMAX).

14. The radio transceiver of claim 9 wherein the first baseband signal includes a composite video signal.

15. The radio transceiver of claim 14 wherein the composite video signal includes at least one of: a transrate compressed signal, and a transcode compressed signal.

16. The radio transceiver of claim 9 wherein the first receiver module is operably coupled to a first antenna and the second receiver module is coupled to a second antenna that is spatially diverse from the first antenna.

17. A multimedia client/server system comprising:
a multimedia server module that includes:
an encoder module for producing an encoded signal from a multimedia input signal;
a first transceiver module for modulating the encoded signal to produce a first radio frequency (RF) signal at a first carrier frequency and for transmitting the first RF signal and for receiving a third RF signal at the first carrier frequency;
a second transceiver module for modulating the encoded signal to produce a second RF signal at a second carrier frequency and for transmitting the second RF signal and for receiving a fourth RF signal at the second carrier frequency;
wherein the first transceiver module and the second transceiver module operate in accordance with a communication protocol that includes a plurality of first channels in a first frequency band and a second plurality of channels in a second frequency band that is separated in frequency from the first frequency band and wherein the first carrier frequency corresponds to one of the plurality of first channels and the second carrier frequency corresponds to one of the plurality of second channels; and
a client module that includes:
a third transceiver module for bidirectionally communicating with the multimedia server module by receiving the first RF signal and converting the first RF signal into a first baseband signal and by transmitting the third RF signal;
a fourth transceiver module for bidirectionally communicating with the multimedia server module by receiving the second RF and converting the second RF signal into a second baseband signal and by transmitting the fourth RF signal;
a recombination module, operably coupled to the third transceiver module and the fourth transceiver module, for combining the first baseband signal and the second baseband signal into an output signal; and
a decoder module, operably coupled to the recombination module, for decoding the output signal into a decoded output signal.

18. The multimedia client/server system of claim 17 wherein the recombination module combines the first baseband signal and the second baseband signal using a maximum ratio recombination.

19. The multimedia client/server system of claim 17 wherein the first transceiver module is selectively tunable to one of a plurality of other carrier frequencies in response to a first channel selection signal.

20. The multimedia client/server system of claim 17 wherein the first RF signal and the second RF signal are carried over separate channels of a broadband wireless access network.

21. The multimedia client/server system of claim 20 wherein the broadband wireless access network conforms to at least one of the following standards: 802.11x, Ultra Wideband (UWB), and Worldwide Interoperability for Microwave Access (WiMAX).

22. The multimedia client/server system of claim 17 wherein the output signal includes a composite video signal.

23. The multimedia client/server system of claim 17 wherein the encoded video signal includes at least one of: a transrate compressed signal, and a transcode compressed signal.

24. The multimedia client/server system of claim 17 wherein the third transceiver module is operably coupled to a first antenna and the fourth transceiver module is coupled to a second antenna that is spatially diverse from the first antenna.

* * * * *